Nov. 14, 1967  R. A. RUBIN  3,353,092
REDUNDANT POWER CONTROL REGULATOR
Filed Sept. 21, 1965  2 Sheets-Sheet 1

Robert A. Rubin,
INVENTOR.
BY.

AGENT.

Nov. 14, 1967  R. A. RUBIN  3,353,092

REDUNDANT POWER CONTROL REGULATOR

Filed Sept. 21, 1965  2 Sheets-Sheet 2

Robert A. Rubin,
INVENTOR.

BY.

AGENT.

United States Patent Office 3,353,092
Patented Nov. 14, 1967

3,353,092
REDUNDANT POWER CONTROL REGULATOR
Robert A. Rubin, Los Angeles, Calif., assignor to TRW Inc., Redondo Beach, Calif., a corporation of Ohio
Filed Sept. 21, 1965, Ser. No. 488,966
6 Claims. (Cl. 323—19)

This invention relates to power control regulators and more particularly to a redundant regulator capable of providing bus voltage regulation for no load and full load conditions in the presence of multiple part failures.

The problem solved by this invention is the achievement of high reliability voltage regulation without utilizing lock-out circuits. In the prior art, high reliability is achieved by using redundant regulating capacity as a stand-by and a sensing circuit capable of continuously comparing and checking the actual output with a desired output. The desired output could be stored and read-out by a programmed means or directly compared with the redundant regulator. Problems inherent in these systems involve the logic components which must then decide which of the reundant regulators is in error. Once a decision is made, the lock-out circuit associated with the offending item must be energized. This action requires a continuous operating lock-out circuit associated with at least major items of the complete regulator. A more subtle problem not generally recognized until recently is the realization that having a redundant regulator, logic circuit, and continuously operating lock-out circuits does not increase reliability but rather actually has an opposite effect. A qualitative analysis shows that the failure of an individual part is sensed indirectly and removed by a continuous lock-out operation that is part of a series chain of events leading to a regulated output. A failure of any of the items in the series chain which now includes the detection circuit itself will affect the total output. The total reliability is reduced by the addition of more components in the series chain leading to the regulated output. In addition to the above degradation of the regulated output must proceed lock-out based on the GO-NO-GO settings of the decision making logic circuit.

The present invention solves the problems associated with the prior art as enumerated. The claimed advantages of the invention are believed due in part to the following:

(1) The total number of parts count is reduced due to a reduced number of subcircuits;

(2) Reliability is improved due to the elimination of the lock-out circuit as a series element in the reliability model;

(3) Corrective response in event of part failure is limited only by transistor or tube response characteristics, whereas the lock-out approach requires a time delay equal to anticipated transient duration;

(4) The circuit is unaffected by sustained transients, whereas the lock-out approach produces permanent lock-out when anticipated transient duration is exceeded; and (5) Regulation degradation is negligible in the event of component failure.

The advantages of this invention result directly from the implementation of a true redundant regulator. The redundant elements are uniquely combined to reduce the total number of parts in a given feed-back loop which thereby increases the reliability. In the preferred embodiment, three separate error amplifiers each continuously generate a separate error signal by comparing a common feedback from the regulated output voltage with a reference source associated with each of the error amplifiers. The next stage comprises three pairs of amplifiers called input and output amplifiers connected in series across a voltage supply source which may be the regulated output voltage. The error signal outputs are used as gate signals and are arranged to control the amplification of an input amplifier and an output amplifier which are not connected in cascade. The output signals from the three output amplifiers each represent an amplified output control signal which may be further amplified or fed directly into a current amplifier for use in a shunt regulator, or into a voltage amplifier for use in a series regulator.

Further objects and advantages will be made more apparent by referring now to the accompanying drawings wherein.

Figure 1:
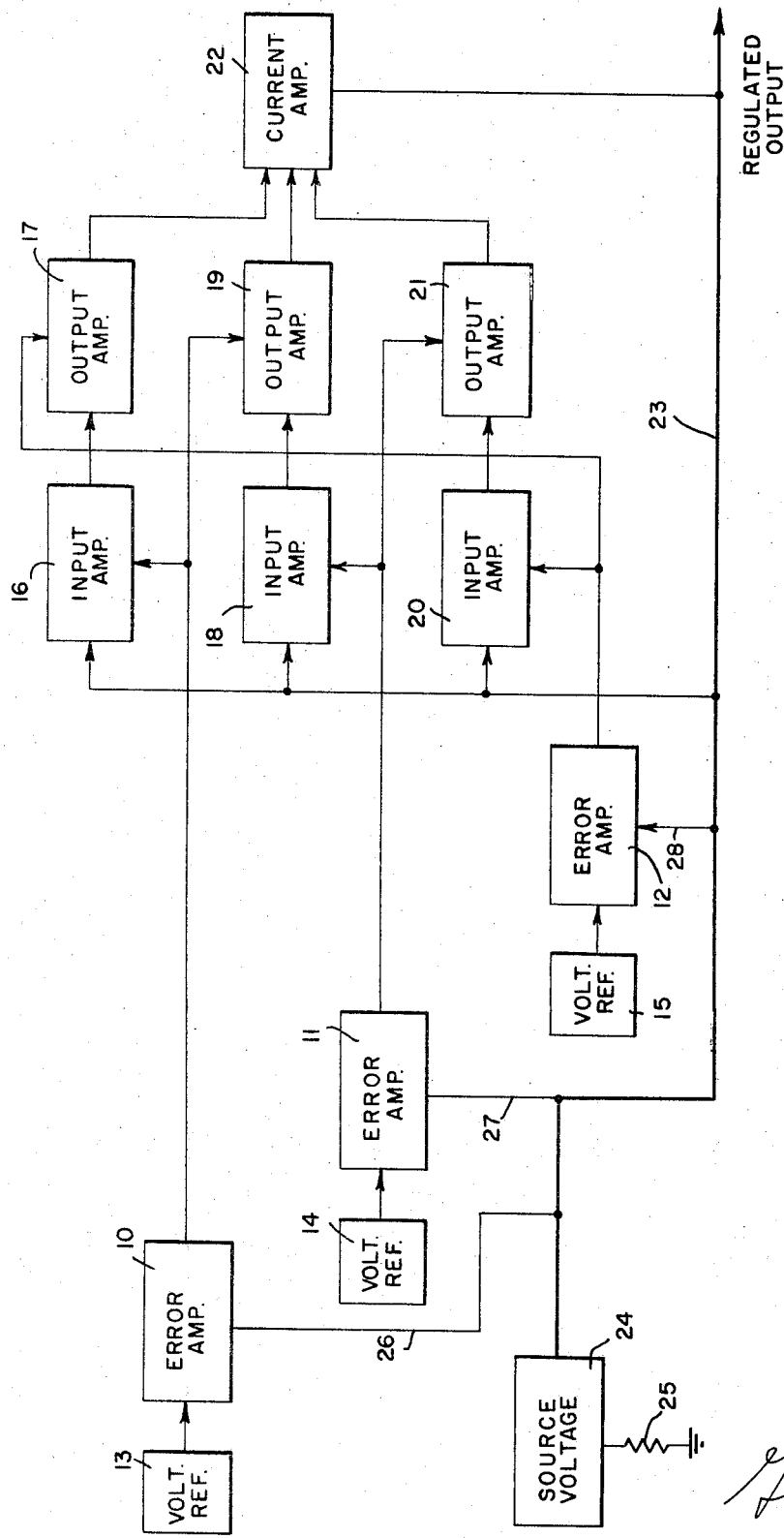
FIGURE 1 is a block diagram illustrating the invention as used in a shunt regulator.

Referring now to FIGURE 1, there is shown a block diagram of this invention comprising three error amplifiers 10, 11, and 12, each associated with a corresponding voltage reference 13, 14 and 15. The second stage comprising six amplifiers 16, 17, 18, 19, 20, 21, in a quasi-bridge configuration wherein three groups of two amplifiers each are in series across a voltage supply source such as amplifiers 16 and 17, amplifiers 18 and 19, and amplifiers 20 and 21. Each series group comprises an input amplifier 16, 18, and 20, and an output amplifier 17, 19, and 21. Each pair of amplifiers is arranged in such a manner that the input amplifier for the group receives a supply voltage from either an independent voltage source (not illustrated) or from the regulated output voltage as shown. The output amplifiers 17, 19, and 21 each receive an operating supply voltage from the corresponding input amplifier defining the pair of input and output amplifiers. The output voltage fed from the output amplifiers 17, 19, and 21 may either be amplified further or fed directly to a current amplifier 22, connected directly to the regulated output voltage bus 23. A voltage source 24 is illustrated in series with an impedance 25 which represents the internal impedance of the source voltage 24 and is connnected across the bus 23 for generating the regulated output voltage.

In operation, each of the error amplifiers 10, 11, and 12 continuously compares the voltage appearing on the bus 23 by means of feedback lines 26, 27, and 28 against each of the reference voltage sources 13, 14, and 15. The error signal generated by each of the error amplifiers 10, 11, and 12 is fed as a gate signal to an input amplifier and an output amplifier which are not connected in series. In other words, the output of error amplifier 10 is connected to input amplifier 16 and output amplifier 19, whereas the output of error amplifier 11 is connected to input amplifier 19 and output amplifier 21 and the output of error amplifier 12 is connected to the input amplifier 20 and the output amplifier 17. A review of the bridge circuit defined by the input and output amplifiers will show that the bridge configuration provides a supply voltage from an input amplifier to a corresponding output amplifier. The input amplifier and output amplifier in any given series line are not under control of the same error signal from any given error amplifier. Consequently, a failure in any given amplifier is overridden by normal inputs from the remaining two error amplifiers which thereby provides normal operation by means of one or two of the three legs of the bridge circuit.

Figure 2:
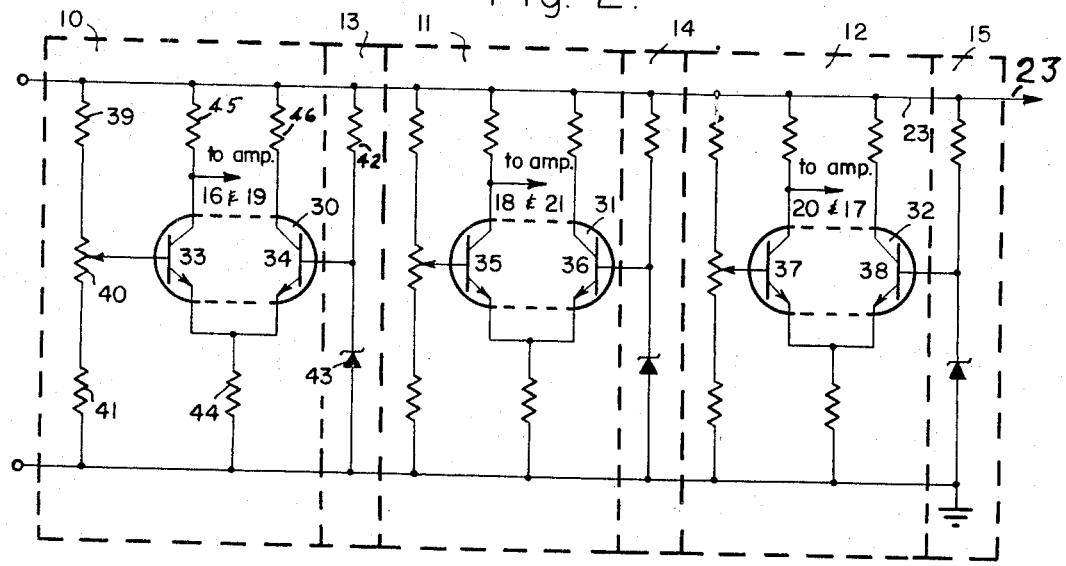
FIGURE 2 is a schematic diagram of a first portion of the redundant regulator illustrated in FIGURE 1.

Referring now to FIGURE 2, there is shown a first part of a schematic diagram illustrating error amplifiers 10, 11, and 12 together with the corresponding reference voltage sources 13, 14, and 15. Similar numbers have been used where appropriate to maintain continuity of description; however, certain liberties have been taken in the interest of clarity and in recognition of the fact that a block diagram as shown in FIGURE 1 is actually a single line diagram, whereas schematic drawings as shown in FIGURES 2 and 3 are across-the-line drawings having return lines not used in a single line block diagram.

Each of the error amplifiers 10, 11, and 12 comprise differential amplifiers 30, 31, and 32, each consisting of a pair of NPN transistors 33–34, 35–36, and 37–38 respectively. The base of transistor 33 is connected in circuit with a voltage divider 39, 40, and 41, which is connected across the regulated output voltage bus 23 and a return line. The values of resistor 39, 40, and 41 are determined by the ratio of the output voltage and the reference voltage used as a measure of the output voltage variations on line 23. The reference source 13 associated with error amplifier 10 comprises an impedance 42 and a Zener diode 43 connected in series and across the regulated output voltage bus 23 and the return line. The impedance of resistor 42 is determined by the breakdown voltage and operating current of the Zener diode 43. The operation of the differential amplifier is such that the emitters of both transistor 33 and 34 are connected together to a common impedance 44 which is connected to the return line. The base of transistor 34 is connected intermediate impedance 42 and the Zener diode 43, thereby locking the voltage appearing between the emitter of transistor 33 and the return line to the voltage appearing across the base of transistor 34 and the return line, which is the reference voltage of the Zener diode 43. The collector of transistor 33 and the collector of transistor 34 are connected through corresponding impedance 45 and 46 to a source voltage which in this case is the regulated output voltage appearing on bus 23. The error output signal generated by the error amplifier 10 is obtained at the collector of transistor 33 and is fed to input amplifier 16 and output amplifier 19. As more fully illustrated in FIGURES 1 and 3, error amplifiers 11 and 12 are similar, if not identical, to the error amplifier 10 just described in detail.

Similarly reference source 14 and 15 cooperate with error amplifiers 11 and 12 respectively in the same manner that reference source 13 cooperates with error amplifier 10. The operation of the regulator is best understood by assuming an increase in the voltage of the regulated output voltage line 23. An increase in the regulated output voltage will be reflected as an increase in the voltage appearing across the base of transistor 33 which results in a greater conduction between the emitter and collector of the transistor. This increased current flow produces an increased voltage drop across resistor 45 thereby lowering the voltage being fed to the input amplifier 16 and the output amplifier 19. This condition will remain until the voltage on the regulated output line 23 is changed. The operation just described in connection with the error amplifier 10 is the same as error amplifiers 11 and 12 except the output of the collector associated with transistor 35 is fed to input amplifier 18 and the output amplifier 21, whereas the output of error amplifier 12 is fed from the collector associated with transistor 37 to the input amplifier 20 and the output amplifier 17. The specific output circuits associated with error amplifiers 10, 11, and 12 are more fully illustrated in connection with the schematic diagram illustrated in FIGURE 3.

Figure 3:
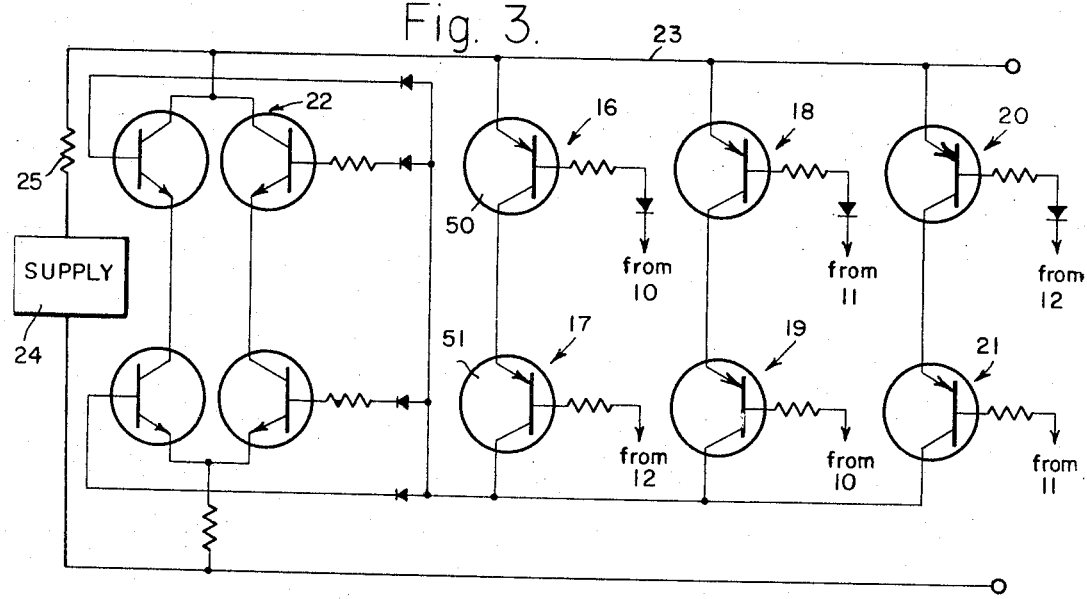
FIGURE 3 is a schematic diagram of a second portion of the invention which, together with FIGURE 2, forms the invention.

Referring now to FIGURE 3, there is shown a schematic diagram consisting of the individual input amplifiers 16, 18, and 20, and the output amplifiers 17, 19, and 21, together with the current amplifier 22. As mentioned previously, a pair of input and output amplifiers are connected in series across an operating supply voltage. In this embodiment, the regulated output voltage forms the supply line for operating all circuits. Input amplifiers 16 and 17 each comprise a PNP transistor 50 and 51 respectively that are connected in series. The emitter of transistor 50 is connected to the supply bus 23 and the collector is connected to the emitter of transistor 51, whereas the collector of transistor 51 of the output amplifier 17 is connected to the current amplifier 22. The base of transistor 50 is connected through a suitable series resistor and diode to the output of the error amplifier 10 illustrated in FIGURES 1 and 2. Similarly, the base of transistor 51 associated with the output amplifier 17 is connected through a suitable resistor to the output of the error amplifier 12 as shown in FIGURES 1 and 2. Input amplifier 18 and output amplifier 19 are connected in series in the same fashion as described in connection with the input amplifier 16 and the output amplifier 17, the difference being that input amplifier 18 receives the output signal from error amplifier 11 whereas output amplifier 19 receives the error signal from error amplifier 10. Input amplifier 20 and output amplifier 21 are similarly connected in series with inputs from error amplifier 12 and error amplifier 11 respectively. The outputs from the output amplifiers 17, 19, and 21 are obtained from the collector circuits of the PNP transistor associated with each of the output amplifiers.

The output lines from each of the output amplifiers 17, 19, and 21 each drive the current amplifier 22 known in the art as a quad which consists of a parallel arrangement of two pairs of NPN transistors connected in series, or a total of four power transsitors, connected across the output bus 23.

The operation is best understood by continuing the example of an increase in the regulated output voltage. As mentioned previously, an increase in the bus voltage results in a voltage decrease appearing on the output of the error amplifier 10 which feeds input amplifier 16 and output amplifier 19. The same increase in bus voltage also results in a voltage decrease appearing on the output of error amplifier 12 which feeds input amplifier 20 and output amplifier 17. A combined lowering of the voltages fed to the base of transistor 50 associated with the input amplifier 16 and the base of transistor 51 associated with input amplifier 17 will cause an increase in the current being passed by transistors 50 and 51 which has the effect of increasing the voltage appearing across the output line. This increased voltage is fed to the NPN transistors associated with the current amplifier 22 thereby causing an increased current flow from the regulated output bus 23 to the return line. This increased current flow through line resistor 25 results in a voltage drop on the regulated output bus 23. The decerase in the error output voltages from error amplifier 10 is also fed to the base associated with the output amplifier 19. This lowering of the base voltage has a similar effect in that the PNP transistor associated with the output amplifier 19 is caused to increase conduction which in conjunction with the effect of amplifier 11 on input amplifier 18 similarly has the effect of increasing the voltage drop across the output line. This action would, of course, continue until the new voltage appearing on the regulated output bus 23 was decreased by the error amplifier 10 as illustrated in FIGURE 1.

The advantages and improved reliability of the disclosed invention is best appreciated by considering different part failures and their effect on the total operation. For example, if error amplifier 10 experiences a part failure which causes its output potential to become negative, bridge amplifiers 16 and 19 are effectively shorted. The voltage at the output of the bridge transistors is then maintained constant by the action of error amplifier 11 and 12 upon bridge amplifiers 18, 17, 20, and 21. Conversely, if error amplifier 10 fails positively, bridge amplifiers 16 and 19 are effectively opened. The voltage at the output of the bridge amplifiers is then maintained constant by the action of error amplifiers 11 and 12 upon bridge amplifiers 20 and 21. Should bridge transistor 50 fail short, the voltage at the output of the bridge amplifiers is maintained constant by the remaining five bridge transistors and the associated error amplifiers. Many double failures are also permissible, by similar reasoning.

The only forbidden failures are the shorted failure of two series bridge transistors such as 50 and 51 and the failure of two error amplifiers, positively or negatively.

It may be noted that normal loop response is determined by the pair of differential amplifiers and associated bridge transistors having the highest gain. Bridge output is amplified by a common amplifier consisting of four transistors in conventional quad configuration shown in the current amplifier 22. Additional quads could be inserted after the current amplifier as required for power gain.

This completes the description of the embodiments illustrated herein. However, this invention is not limited to the particular details of construction, materials and processes described, as many equivalents will suggest themselves to those skilled in the art. It is accordingly desired that the appended claims be given a broad interpretation commensurate with the scope of the invention within the art.

The embodiments of the invention in which an exclusive property or privilege is claimed are defined as follows:

1. In combination,
   a source of power for generating an output potential,
   a plurality of reference voltage sources,
   a plurality of error amplifiers each receiving an input from one of said reference sources and said output potential for generating at least three error signals,
   a plurality of pair of input and output amplifiers connected in series across a supply voltage source,
   each of said error signals from said error amplifiers being connected to an input and output amplifier not connected in series; and
   a regulating circuit responsive to each of said output amplifiers for controlling said output potential.

2. A combination according to claim 1 in which the supply voltage source connected across the pair of input and output amplifiers is the defined output potential.

3. In combination,
   a source of power for generating an output potential,
   three reference voltage sources,
   three error amplifiers each receiving an input from one of said reference sources and said output potential for generating three error signals,
   three pair of input and output amplifiers connected in series across a supply voltage source,
   each of said error signals from said error amplifiers being connected to an input and output amplifier not connected in series, and
   a regulating circuit responsive to each of said output amplifiers for controlling said output potential.

4. In combination,
   a source of power for generating an output potential,
   a reference voltage source,
   at least three error amplifiers each arranged to generate an error signal in response to the difference between said reference source and said output potential,
   at least three pair of input and output amplifiers connected in series across a supply voltage source,
   each of said error amplifiers controlling an input and output amplifier not connected in series, and
   a regulating circuit responsive to each of said output amplifiers for controlling said output potential.

5. In combination,
   a source of power for generating an output potential,
   three Zener diodes forming independent reference voltage sources,
   three differential error amplifiers each arranged to generate an error signal in response to the difference between one of said Zener diode reference sources and said output potential,
   three pair of input and output amplifiers connected in series across a supply voltage source,
   each of said error signals from said error amplifiers controlling the amplification of an input and output amplifier not connected in series, and
   a regulating circuit responsive to the amplified output of said output amplifiers for controlling said output potential.

6. a redundant DC regulator comprising
   means for generating an output potential,
   a reference voltage source,
   three error amplifiers each generating an error signal in response to the difference between said reference voltage and said output potential,
   three pair of input and output amplifiers connected in series across a supply voltage source,
   each of said error signals controlling the amplification of an input and output amplifier not connected in series, and
   a regulating circuit responsive to each of said output amplifiers for controlling said output potential.

References Cited
UNITED STATES PATENTS

| 3,156,855 | 11/1964 | Righton et al. | 318—19 |
| 3,219,913 | 11/1965 | Brown | 323—22 |

JOHN F. COUCH, *Primary Examiner.*

A. D. PELLINEN, *Assistant Examiner.*